United States Patent
Wurmfeld et al.

(10) Patent No.: US 12,519,803 B2
(45) Date of Patent: Jan. 6, 2026

(54) TOKEN-BASED MESSAGE AUTHENTICATION

(71) Applicant: Capital One Services, LLC, McLean, VA (US)

(72) Inventors: David Kelly Wurmfeld, Melbourne, FL (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 138 days.

(21) Appl. No.: 18/490,421

(22) Filed: Oct. 19, 2023

(65) Prior Publication Data

US 2025/0133089 A1    Apr. 24, 2025

(51) Int. Cl.
*H04L 9/40* (2022.01)

(52) U.S. Cl.
CPC .......... *H04L 63/123* (2013.01); *H04L 63/083* (2013.01); *H04L 63/1483* (2013.01)

(58) Field of Classification Search
CPC .. H04L 63/123; H04L 63/083; H04L 63/1483
See application file for complete search history.

(56) References Cited

U.S. PATENT DOCUMENTS

| | | | |
|---|---|---|---|
| 7,580,982 B2 | 8/2009 | Owen et al. | |
| 8,090,940 B1* | 1/2012 | Fenton | H04L 51/212 713/160 |
| 8,112,483 B1* | 2/2012 | Emigh | G06F 21/36 713/182 |
| 8,966,621 B1* | 2/2015 | Johansson | H04L 63/12 726/30 |
| 8,984,640 B1* | 3/2015 | Emigh | H04L 51/212 726/13 |
| 10,652,276 B1* | 5/2020 | Rambo | H04L 63/1433 |
| 11,257,090 B2* | 2/2022 | Searl | G06Q 20/3223 |
| 11,665,538 B2* | 5/2023 | Chikkala | H04W 12/71 380/270 |
| 12,101,352 B1* | 9/2024 | Opos | H04L 63/1416 |
| 2003/0009698 A1* | 1/2003 | Lindeman | H04L 63/08 709/224 |
| 2005/0033635 A1* | 2/2005 | Jeon | G06Q 30/0239 705/14.39 |
| 2006/0212520 A1* | 9/2006 | Logue | H04L 63/0823 709/206 |
| 2012/0066498 A1* | 3/2012 | Engert | H04L 63/126 713/170 |
| 2016/0359892 A1* | 12/2016 | Sasatani | H04L 51/48 |
| 2022/0385648 A1* | 12/2022 | Keiter | H04L 63/083 |
| 2024/0056477 A1* | 2/2024 | Rangwala | H04L 63/1416 |
| 2024/0179135 A1* | 5/2024 | Albero | H04L 63/0428 |

(Continued)

*Primary Examiner* — Michael Pyzocha
(74) *Attorney, Agent, or Firm* — Harrity & Harrity, LLP

(57) ABSTRACT

In some implementations, a user device may receive, using a first application of the user device, a message that is purported to be from a source. The message may include, in a content of the message, content data and authenticity data, where the authenticity data includes a token. The user device may determine, using a second application of the user device, whether the message is authentic based on the authenticity data, where the second application is associated with the source. The user device may cause an indication of whether the message is authentic to be presented in a user interface of the user device.

20 Claims, 8 Drawing Sheets

(56) References Cited

U.S. PATENT DOCUMENTS

2025/0111046 A1\* 4/2025 Pascual ................. G06F 21/554
2025/0133089 A1\* 4/2025 Wurmfeld ........... H04L 63/1483
2025/0233866 A1\* 7/2025 Chuprevich .......... H04L 63/123

\* cited by examiner

TOKEN-BASED MESSAGE AUTHENTICATION

BACKGROUND

One common form of computer attack is a phishing attempt. A phishing attempt includes a communication, sent to a user, that uses impersonation (or another form of trickery or deception) to entice the user to provide a set of credentials to an attacker.

SUMMARY

Some implementations described herein relate to a system for token-based message authentication. The system may include one or more memories and one or more processors communicatively coupled to the one or more memories. The one or more processors may be configured to receive, using a first application, a message that is purported to be from a source, where the message includes, in a content of the message, content data and authenticity data, and where the authenticity data includes a token and tag data. The one or more processors may be configured to transmit, to a device and using a second application, an authentication request that includes the authenticity data, where the device is associated with the source. The one or more processors may be configured to receive, from the device and using the second application, an authentication response indicating whether the message is authentic, where the authentication response indicates that the message is authentic if the token matches an authentic token and the tag data satisfies one or more conditions of authenticity. The one or more processors may be configured to cause, based on the authentication response, an indication of whether the message is authentic to be presented in a user interface.

Some implementations described herein relate to a method of token-based message authentication. The method may include receiving, by a user device and using a first application of the user device, a message that is purported to be from a source, where the message includes, in a content of the message, content data and authenticity data, and where the authenticity data includes a token. The method may include determining, by the user device and using a second application of the user device, whether the message is authentic based on the authenticity data, where the second application is associated with the source. The method may include causing, by the user device, an indication of whether the message is authentic to be presented in a user interface of the user device.

Some implementations described herein relate to a non-transitory computer-readable medium that stores a set of instructions. The set of instructions, when executed by one or more processors of a device, may cause the device to receive, using a first application, a message that is purported to be from a source, where the message includes, in a content of the message, content data and authenticity data, and where the authenticity data includes a token. The set of instructions, when executed by one or more processors of the device, may cause the device to determine, using a second application, whether the message is authentic based on the authenticity data, where the second application is associated with the source. The set of instructions, when executed by one or more processors of the device, may cause the device to perform one or more actions based on determining whether the message is authentic.

DETAILED DESCRIPTION

Figure 1A:
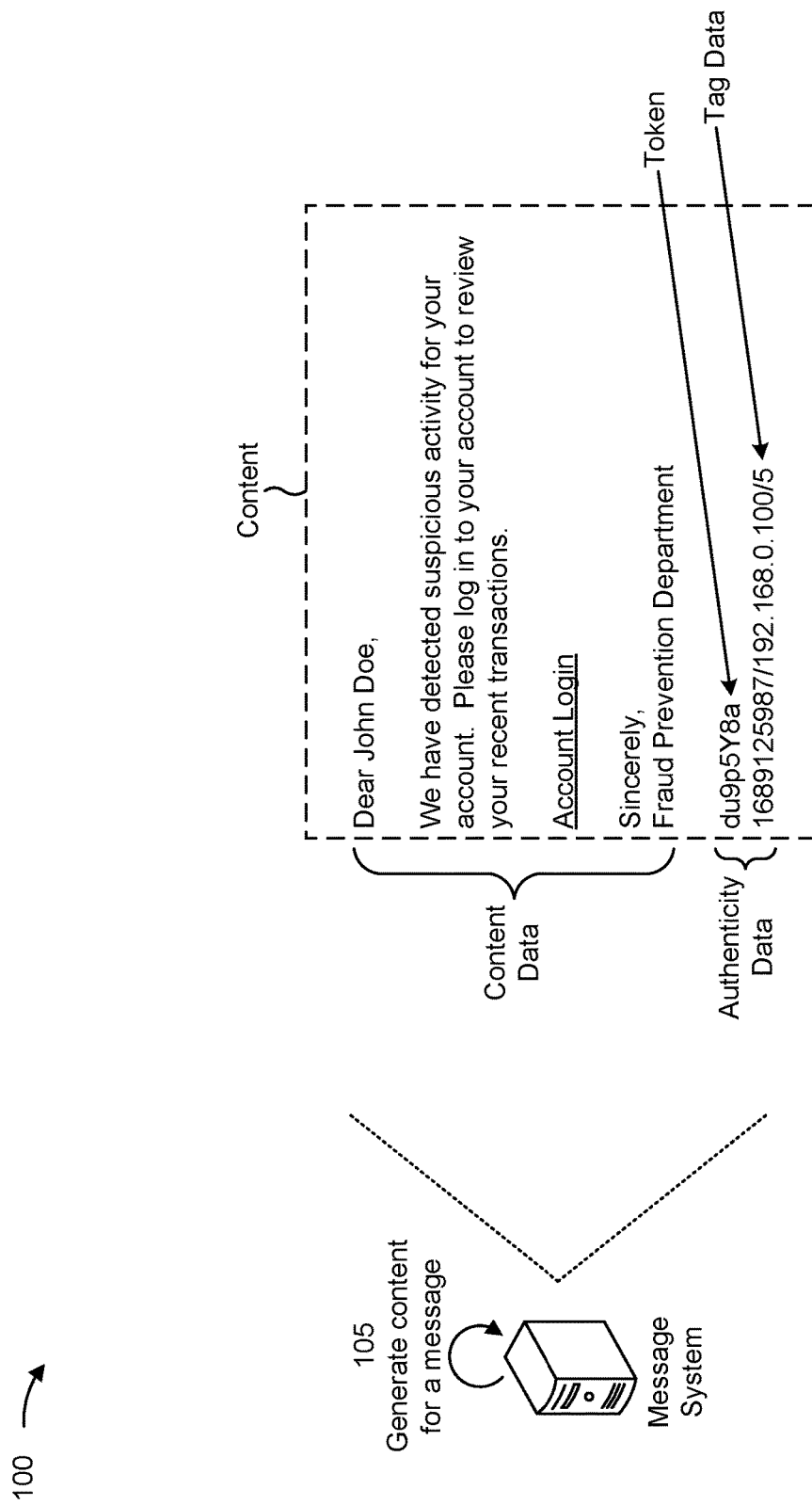
FIGS. 1A-1D are diagrams of an example associated with token-based message authentication, in accordance with some embodiments of the present disclosure.

The following detailed description of example implementations refers to the accompanying drawings. The same reference numbers in different drawings may identify the same or similar elements.

In a phishing attempt, an attacker transmits a communication, to a user, that uses impersonation (or another form of trickery or deception) to entice the user to voluntarily provide a set of credentials, associated with the user, to the attacker. For example, the attacker may send an email message impersonating a bank, an insurance company, a merchant, or another legitimate actor and include a hyperlink. The user may follow the hyperlink and provide the set of credentials to the attacker via a website that impersonates the legitimate actor's website. Successful phishing attacks may compromise computer and network security, allow the attacker to take control of a digital account, and/or expose digital files and network devices to use or control by the attacker. Moreover, successful phishing attacks can result in significant downtime (e.g., by enabling a denial-of-service (DoS) attack). Additionally, remediation of successful phishing attacks consumes significant computing resources (e.g., processor resources and/or memory resources) in order to modify the user's set of credentials and to undo actions performed by the attacker with the user's previous set of credentials.

Some implementations described herein enable a user device to determine an authenticity of an incoming message that is purported to be from a legitimate source. In some implementations, a content of the message may include content data (e.g., information that is being conveyed to a recipient of the message) and authenticity data (e.g., information that can be used to authenticate the messages, but which can be falsified by a fraudulent actor). The authenticity data may include a token (e.g., a hash value of the content data of the message) and/or tag data (e.g., metadata, such as a timestamp associated with the transmission of the message, location data associated with a sender of the message, and/or a content code indicating a type of the content data).

The user device may receive the message using a first application of the user device, such as an email client or a messaging application. Based on receiving the message, the user device may use a second application of the user device to determine whether the message is authentic. The second application may be associated with the purported source of the message. For example, the second application may be a mobile application associated with the purported source of the message. Using the second application, the user device may extract the authenticity data from the message, and may transmit an authentication request, including the authenticity data, to a device associated with the purported source of the message. The user device may then receive an authentication response from the device indicating whether the message is authentic (e.g., based on the authenticity data). Based on whether the message is authentic, the user device may perform an action, such as causing presentation of an indication of whether the message is authentic in a user interface associated with the first application.

In this way, messages purported to be from a legitimate source can be accurately authenticated in real time or near-real time. Accordingly, techniques described herein improve computer and network security by reducing the chances of successful phishing attacks. Moreover, reducing the chances of successful phishing attacks improves system and service uptime as well as conserves computing resources that would otherwise be expended on remediating the successful phishing attacks.

FIGS. 1A-1D are diagrams of an example 100 associated with token-based message authentication. As shown in FIGS. 1A-1D, example 100 includes a message system and a user device. These devices are described in more detail in connection with FIGS. 2 and 3.

The message system may be associated with a source (e.g., a legitimate source) that transmits messages. For example, the source may be an entity, such as a financial institution, that transmits messages (e.g., email messages, text messages, or the like) to users (e.g., account holders) associated with the entity. The message system may include a system to transmit messages and/or a system to authenticate messages that have been transmitted, as described herein.

The user device may be associated with a user (e.g., a user that is associated with the entity). The user device may implement a plurality of applications, such as a first application and a second application. The first application may be configured to receive incoming messages to the user. For example, the first application may include an email client, a web browser, a messaging application, a telephone application, a voicemail application, or the like. The second application may be configured to authenticate messages received at the user device. In addition, the second application may be configured for a function other than authenticating messages, such as an online banking function, an account management function, and/or a payment transfer function, among other examples. The second application may include a mobile application (sometimes referred to as an "app"), an application for a particular operating system (sometimes also referred to as an "app"), or an application extension or plugin. For example, in some implementations, the second application may include an extension or a plugin for the first application (e.g., a web browser).

The second application may be associated with the source. For example, the second application may be published by the source or may otherwise be configured to communicate with one or more devices (e.g., servers) of the source (e.g., without user direction), such as the message system associated with the source. As an example, the second application may be an online banking application for the source, or a message authenticator application specific to the source. In other words, the second application may be configured to authenticate messages purported to be from the source, but not to authenticate messages purported to be from one or more other sources. That is, the second application may not be configured for authentication of every incoming message to the user device, but rather only incoming messages purported to be from the source (or one or more particular additional sources).

As shown in FIG. 1A, and by reference number 105, the message system may generate content for a message. The message may include an email message, a text message, an audio message for a telephone call (e.g., an automated telephone call), or the like. The content may include content data and authenticity data. The content data may include information that is being conveyed to a recipient of the message (e.g., a reader of the message or a listener of the message), such as information relating to an account (e.g., a financial account). For example, the content data may include a notification of a log in attempt for the account, a notification of suspected fraudulent activity associated with the account, a notification that a password for the account has been changed, a request to change a password for the account, a request to update account information for the account, a request to provide confirmation of a transaction posted to the account, or the like. Additionally, the content data may include a link to a web page where account actions (e.g., changing a password, updating account information, confirming a transaction, or the like) can be performed, and/or the content data may identify a customer service telephone number. In an example of an email message, the content may include a subject and/or a body of the email message.

The authenticity data may include a token and/or tag data. The token may provide a direct indication of an authenticity of the message (e.g., a valid token, by itself, indicates that the message is authentic), and the tag data may provide an indirect indication of the authenticity of the message (e.g., the tag data agreeing with reference data implies that the message is authentic). The token may include an alphanumeric string (e.g., that is unique to the message). For example, the message system may tokenize the content data of the message to obtain the token. As an example, the token may include a hash value of the content data. In some implementations, the authenticity data may include a digital signature, and the digital signature may include a public key and the token, which may be an encrypted value (e.g., based on a private key) of the hash value. In some implementations, the message system may store information indicating the token used for the message to enable subsequent authentication of the message based on the token.

The tag data may include information (e.g., metadata) relating to a transmission of the message. For example, the tag data may include a timestamp associated with the transmission of the message (e.g., indicating a time the message was generated, scheduled for transmission, or actually transmitted). Additionally, or alternatively, the tag data may include location data associated with a sender of the message. The location data may include an Internet Protocol (IP) address associated with a sending device (e.g., which may indicate a geographic location based on IP address geolocation), geographic coordinates associated with the sending device, a zip code or city associated with the sending device, or the like. Additionally, or alternatively, the tag data may include a content code indicating a type of the content data. For example, a first content code may be used to indicate a first type of the content data (e.g., content data indicating a notification of a log in attempt), a second content code may be used to indicate a second type of the content data (e.g., content data indicating a notification of suspected fraudulent activity), and so forth. In some implementations, the tag data may be encrypted (e.g., based on the private key used to encrypt the hash value of the token), but unhashed. In some implementations, the message system does not store information indicating the tag data (e.g., because the tag data can indicate the authenticity of the message based on reference information that is stored by the message system). The tag data may provide an additional security measure to the token that enables detection of deepfake messages, which can potentially include a valid token.

In some implementations, the authenticity data may be concealed in the content of the message, whereas the content data may be unconcealed in the content of the message. In an example where the message is an email message, or another type of message that is intended for viewing, the content of the message may be configured for presentation over a background color (e.g., a white background). Continuing with the example, the content data may be configured for presentation in a contrasting color (e.g., black) to the background color, whereas the authenticity data may be configured for presentation in the background color. In this way, the authenticity data may be readable by a computer, but may be invisible to a viewer of the message (or in a screenshot of the message). In an example where the message is an audio message for a telephone call, the content data may be configured to be audible for human hearing, whereas the authenticity data may be configured to be inaudible for human hearing. For example, the content data may be in a human-audible frequency range (e.g., from about 20 Hz to about 20 kHz or from about 2 kHz to about 5 kHz), whereas the authenticity data may be in an infrasound frequency range (e.g., less than 20 Hz) or an ultrasound frequency range (e.g., greater than 20 kHz). In another example, the content data may be configured with a greater loudness (e.g., greater than 0 dB) than a loudness configured for the authenticity data (e.g., less than or equal to 0 dB). In this way, the authenticity data may be perceived by a computer, but may be imperceptible to a listener of the message.

Figure 1B:
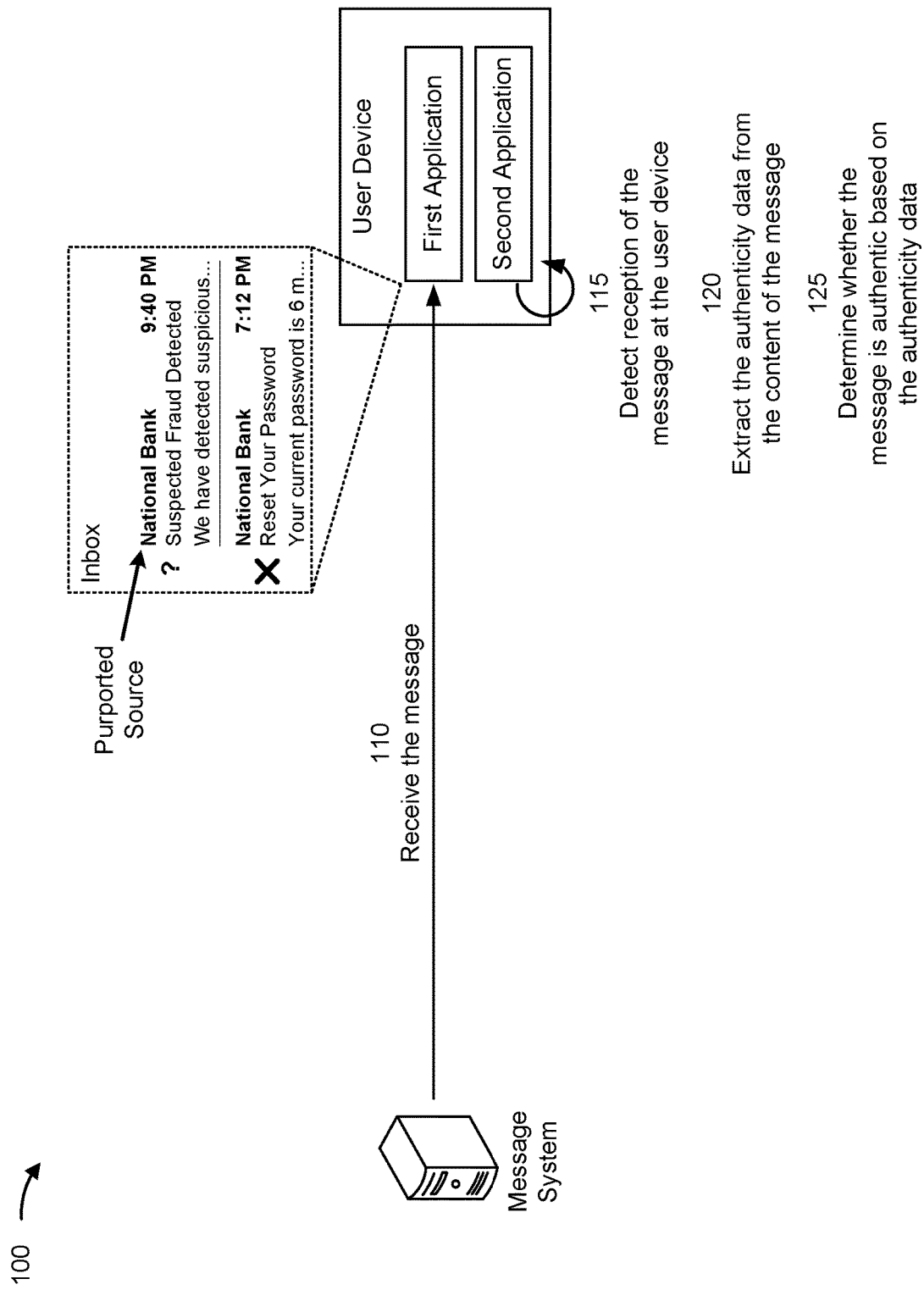

As shown in FIG. 1B, and by reference number 110, the message system may transmit, and the user device may receive, the message. For example, the user device may receive the message as an email message, a text message, an audio message in a telephone call, or the like. The user device may receive the message using the first application of the user device. The message may be purporting to be from a particular source (e.g., by including a name of the source, a logo of the source, and/or a color scheme of the source, or the like).

As shown by reference number 115, the user device, using the second application of the user device, may detect reception of the message at the user device. For example, the second application may execute in a background mode on the user device to monitor for incoming messages received by the user device using the first application. As another example, the second application may be invoked upon reception of an incoming message by the user device using the first application. The message may be analyzed for authenticity upon detecting reception of the message (e.g., the user device may analyze each incoming message for authenticity).

In some implementations, the user device may receive, via the first application or the second application (e.g., via a user interface of the first application or the second application), a user input identifying the message. For example, the user input may be a selection of the message from a list of messages that have been downloaded at the user device. The user input identifying the message may indicate that the message is to be analyzed for authenticity (e.g., the user device may analyze only those messages selected by a user for authentication).

In some implementations, the user device may identify that the message is purported to be from the source. For example, the user device may identify that the message is purported to be from the source based on sender information for the message (e.g., an email address, a telephone number, or the like, associated with a sender of the message) and/or based on the content of the message (e.g., the content data indicates a name of the source, includes a logo of the source, includes a color scheme of the source, or the like, and/or the authenticity data is in a format used by the source). The user device may use keyword searching, natural language processing (NLP), and/or a computer vision technique to identify whether the content data indicates a name of the source, includes a logo of the source, includes a color scheme of the source, or the like. The user device may use a pattern matching operation or a regular expression to identify whether the authenticity data is in a format used by the source. Based on determining that the message is purported to be from the source, the user device may determine that the second application can be used to authenticate the message. For example, if the user device were to determine, using a third application (that is similar to the second application, but associated with a different source), that the message is purported to be from the different source associated with the third application, then the user device may determine that the third application can be used to authenticate the message (rather than the second application), and so forth.

As shown by reference number 120, the user device, using the second application, may extract the authenticity data from the content of the message. For example, the user device may extract the authenticity data from the message based on detecting reception of the message or based on receiving the user input identifying the message. In examples where the token and/or the tag data are encrypted, the user device may decrypt the token and/or the tag data using the public key.

To extract the authenticity data from the content of the message, the user device may perform a pattern matching operation on the content, may process the content using one or more regular expressions, may parse the content based on markup language tags, or the like. In some implementations, to extract the authenticity data from the content of the message (e.g., an email message), the user device may scan the content (e.g., scan code that configures the content) for text configured in a same color as a background color of the content. In some implementations, to extract the authenticity data from the content of the message (e.g., an audio message), the user device may scan the content for a signal that is inaudible to human hearing (e.g., an infrasound signal or an ultrasound signal).

In some implementations, the user device may receive, via the second application (e.g., via a user interface of the second application), a user input identifying the authenticity data in the content of the message (e.g., when the authenticity data is not concealed in the content of the message). For example, the user may copy the authenticity data from the message and paste the copied authenticity data into an input element of the second application. In some implementations, the user device may determine (e.g., based on attempting to extract the authenticity data) that authenticity data is absent from content of a message, and accordingly, the user device may determine that the message is not authentic based on the absence of the authenticity data.

As shown by reference number 125, the user device may determine whether the message is authentic based on the authenticity data. For example, the message, purporting to be from a particular source, may be authentic if a sender of the message is the source or a party authorized by the source to send the message. Stated differently, the message may be not authentic if the message purports to be from a source that did not send or authorize sending of the message (e.g., a phishing message).

Figure 1C:
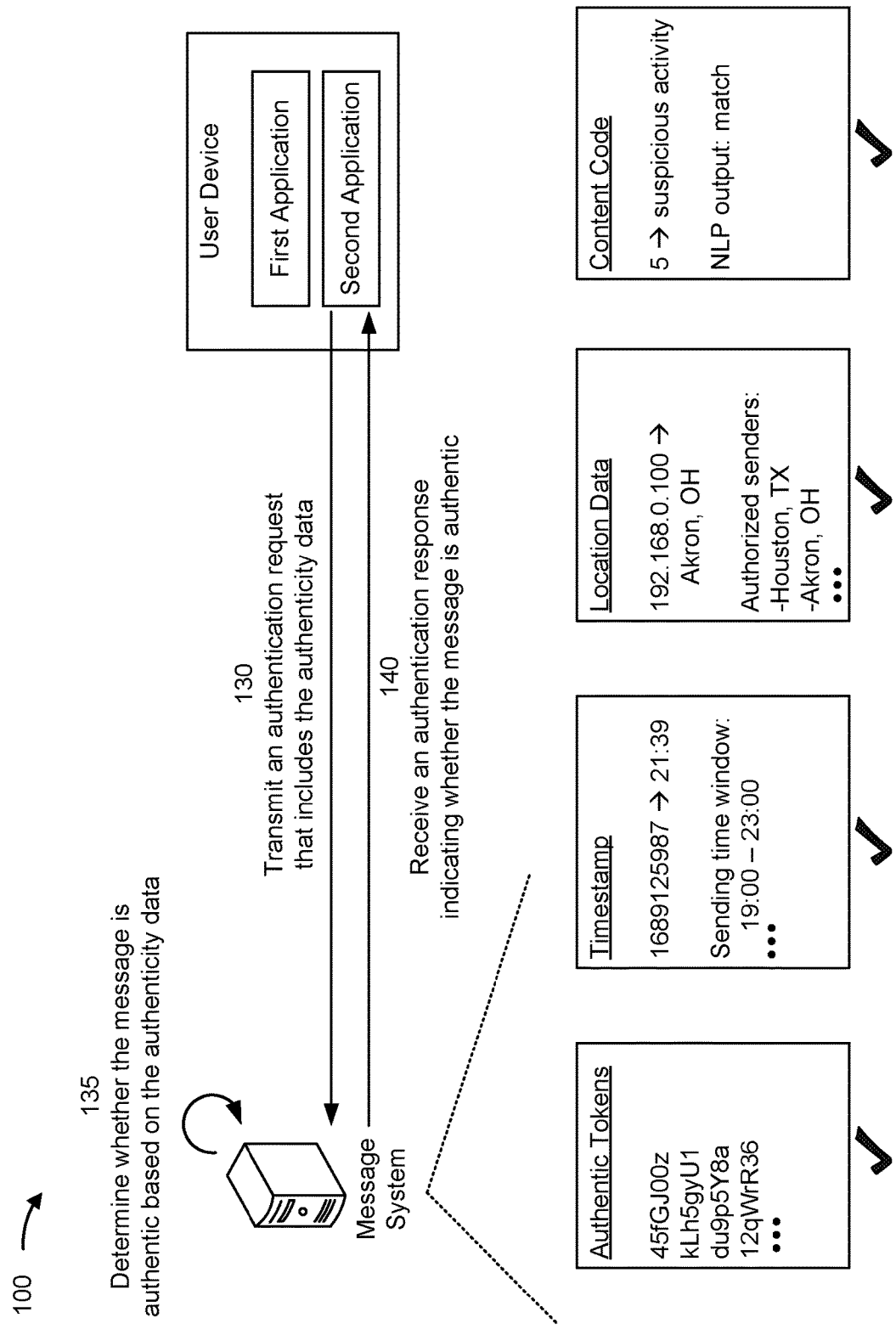

For example, the user device may use the second application to determine whether the message is authentic based on the authenticity data. In some implementations, as shown in FIG. 1C, and by reference number 130, to determine whether the message is authentic, the user device, using the second application, may transmit, and the message system may receive, an authentication request that includes the authenticity data (e.g., that was extracted from the content of the message). In some implementations, the authentication request may further include the content data, or a portion thereof. The user device may transmit the authentication request based on detecting reception of the message at the user device, based on reception of the user input identifying the message, and/or based on reception of the user input identifying the authenticity data, as described herein.

As shown by reference number 135, the message system may determine whether the message is authentic based on the authenticity data. For example, the message system may compare the token of the authenticity data to a set of authentic tokens (e.g., a historical record of tokens used in messages transmitted by the message system) to identify whether the token matches an authentic token. Accordingly, the token matching the authentic token may indicate that the message is authentic, whereas the token not matching any authentic token may indicate that the message is not authentic.

In some implementations, the message system may evaluate the tag data to determine whether the message is authentic. For example, the message system may evaluate the tag data to identify whether the tag data satisfies one or more conditions of authenticity. In an example in which the tag data includes the content code, the message system may process the content data (e.g., when the authentication request includes the content data) using NLP to identify whether the content data is of the type indicated by the content code (e.g., a condition of authenticity may be that the content data is of the type indicated by the content code). For example, if the content code indicates a suspicious activity content type, the message system may process the content data using NLP to identify whether the content data relates to a suspicious activity notification. Accordingly, the content data agreeing with the type indicated by the content code may indicate that the message is authentic, whereas the content data not agreeing with the type indicated by the content code may indicate that the message is not authentic.

The message system may store reference data indicating a mapping of content codes to content types to enable evaluation of the content code. In some implementations, the mapping may be re-mapped from time to time (e.g., the message system may perform the re-mapping or may receive an indication of the re-mapping from another device) in case an attacker has learned the mapping.

In an example in which the tag data includes the timestamp, the message system may determine whether the timestamp corresponds to a time when messages sharing one or more characteristics with the message are supposed to be transmitted (e.g., a condition of authenticity may be that the timestamp corresponds to a time when messages sharing one or more characteristics with the message are supposed to be transmitted). For example, the characteristics may relate to a location of a sender, a content type, and/or a channel type (e.g., an email channel, a text channel, a telephone channel, or the like), among other examples. As an example, a sending device located at a particular location (e.g., a particular city, state, time zone, country, or the like) may be scheduled to transmit messages during a particular time window. As another example, sending devices may be scheduled to transmit messages associated with a particular content type (e.g., which the message system may determine for the message based on performing NLP of the content data and/or based on the content code of the tag data) during a particular time window. As a further example, sending devices may be scheduled to transmit messages associated with a particular channel type during a particular time window (e.g., text messages may be scheduled to be transmitted before 8 pm, whereas email messages may be scheduled to be transmitted after 8 pm). Thus, the timestamp corresponding to a time that is within a relevant time window may indicate that the message is authentic, whereas the time being outside of the time window may indicate that the message is not authentic.

The message system may store reference data indicating various time windows and associated use conditions for the time windows to enable evaluation of the timestamp. In some implementations, the time windows associated with use conditions may be modified from time to time (e.g., the message system may perform the modification or may receive an indication of the modification from another device) in case an attacker has learned the associations of time windows and use conditions.

In an example in which the tag data includes the location data, the message system may determine whether the location data corresponds to a location of an authorized sender (e.g., the source or a third party authorized by the source) of messages for the source (e.g., a condition of authenticity may be that the location data corresponds to a location of an authorized sender of messages for the source). For example, the message system may compare the location data to a set of locations associated with authorized senders to identify whether the location data corresponds to a location of an authorized sender. In an example in which the location data includes an IP address, the message system may identify a location associated with the IP address using IP address geolocation. Accordingly, the location data corresponding to a location of an authorized sender may indicate that the message is authentic, whereas the location data not corresponding to a location of any authorized sender may indicate that the message is not authentic.

The message system may store reference data indicating locations of authorized senders to enable evaluation of the location data. In some implementations, the authorized senders may be modified from time to time (e.g., the message system may perform the modification or may receive an indication of the modification from another device) in case an attacker has learned the locations of the authorized senders.

The message system may determine that the message is authentic if the token matches an authentic token and/or if the tag data satisfies one or more conditions of authenticity. For example, the message system may determine that the message is authentic if both the token matches an authentic token and the tag data satisfies one or more conditions of authenticity (e.g., the token and the tag data provide multiple layers of authentication). Conversely, the message system may determine that the message is not authentic if the token does not match an authentic token and/or if the tag data does not satisfy one or more conditions of authenticity.

As shown by reference number 140, the message system may transmit, and the user device may receive, using the second application, an authentication response indicating whether the message is authentic. For example, the authentication response may indicate that the message is authentic if the token matches an authentic token and/or if the tag data satisfies one or more conditions of authenticity. In some examples, the authentication response may indicate whether the message is authentic by indicating whether the token matches an authentic token and/or indicating whether the tag data satisfies one or more conditions of authenticity. The user device may determine whether the message is authentic based on the authentication response.

In some implementations, the user device may perform one or more of the operations described above as being performed by the message system to determine whether the message is authentic. For example, the user device may determine whether the tag data satisfies one or more conditions of authenticity, in a similar manner as described above. In some examples, the user device may determine whether the tag data satisfies one or more conditions of authenticity, but the user device may still rely on the authentication response from the message system to determine whether the token matches an authentic token.

In some implementations, the authentication request may indicate a request for the set of authentic tokens (rather than the authentication request including the authenticity data). For example, the request may indicate a time range (e.g., based on a transmission time indicated in metadata of the message) for the set of authentic tokens. Accordingly, the authentication response may indicate the set of authentic tokens (e.g., that are associated with the time range indicated by the request). Thus, the user device may determine whether the message is authentic by comparing the token of the authenticity data to the set of authentic tokens to identify whether the token matches an authentic token, in a similar manner as described above. In some examples, the message system may periodically provide an updated set of authentic tokens to the user device via the second application (e.g., without the user device having to request the set of authentic tokens).

Accordingly, the user device may determine whether the message is authentic based on the authentication response alone, based on a determination of the user device as to whether the token matches an authentic token and/or whether the tag data satisfies one or more conditions of authenticity, and/or based on a combination of the authentication response and the determination of the user device (e.g., the authentication response may indicate whether the token matches an authentic token and the user device may determine whether the tag data satisfies one or more conditions of authenticity).

Figure 1D:
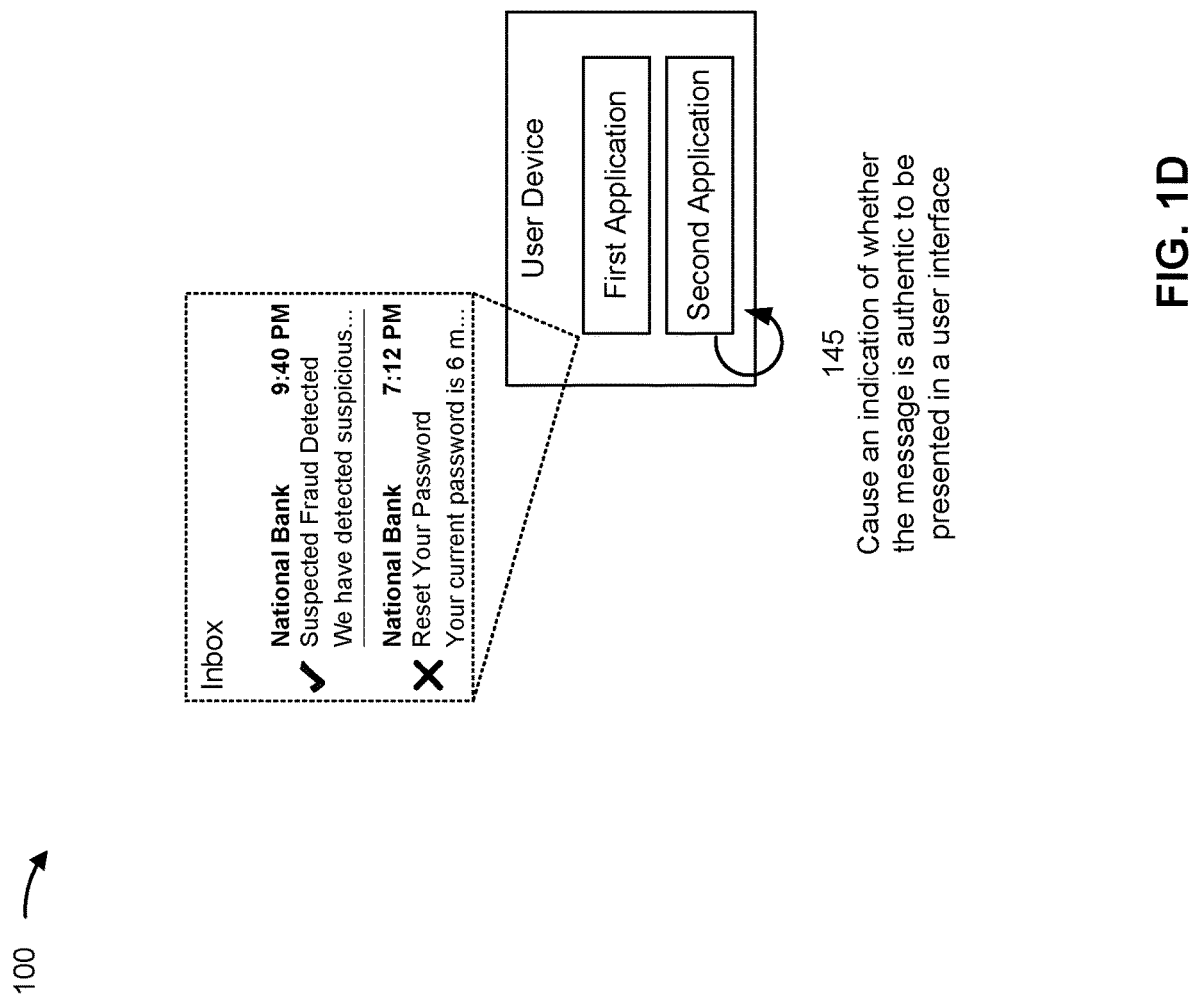

The user device may perform one or more actions based on determining whether the message is authentic. As shown in FIG. 1D, and by reference number 145, the user device may cause an indication of whether the message is authentic to be presented in a user interface of the user device. For example, the indication of whether the message is authentic may be based on a determination of the user device as to whether the message is authentic. As an example, the indication of whether the message is authentic may be based on the authentication response, and/or a determination of the user device as to whether the token matches an authentic token and/or whether the tag data satisfies one or more conditions of authenticity.

The user interface may be associated with the first application of the user device. For example, the user interface of the first application may include a list of messages (including the message for which authenticity was assessed) received at the user device. If the message is determined to be authentic, the indication may include a first user interface element, associated with the message, in the user interface. For example, the first user interface element may be a check mark symbol next to the message in the list of messages, green highlighting of the message in the list of messages, or the like. Conversely, if the message is determined to be inauthentic, the indication may include a second user interface element, associated with the message, in the user interface. For example, the second user interface element may be an "X" symbol next to the message in the list of messages, red highlighting of the message in the list of messages, or the like.

In some implementations, textual content of the content of the message may be rendered, in the user interface, using a font having a built-in defect (e.g., the textual content may be configured for display using the font). The built-in defect of the font may cause the textual content to be displayed in an unreadable or obscured manner. Based on determining that the message is authentic (e.g., the authenticity data has been authenticated), the user device may use the authenticated authenticity data (e.g., the token) to resolve the built-in defect of the font (e.g., the authenticity data is or includes a key to resolve the defect), thereby causing the textual content to be rendered in a readable and unobscured manner.

In some implementations, if the message is determined to be not authentic, the user device may cause the message to be deleted, may cause the message to be moved to a quarantine location, and/or may transmit a report (e.g., to a message service provider, an internet service provider, a governmental entity, or the like) indicating that the message is not authentic. Additionally, or alternatively, the user device may generate a filter rule (e.g., a spam filter rule) for the first application indicating that future messages from a sender of the message and/or future messages having one or more characteristics of the message are to be deleted or moved to a quarantine location. In some implementations, if the message is determined to be not authentic, the user device may monitor whether a user input in the user interface indicates a command to open the message or to follow a link in the message. Here, the indication may be an alert message (e.g., warning that the message is not authentic) in the user interface that is triggered based on detecting the user input. Additionally, or alternatively, the user device may block opening of the message or block following the link in the message.

In some implementations, the user interface may be associated with the second application of the user device (e.g., when the user input identifying the message and/or the user input identifying the authenticity data is received via the second application). Here, the indication may be a message (e.g., a pop-up message) in the user interface or a user interface element indicative of whether the message is authentic (e.g., a check mark symbol or an "X" symbol, as described above).

In this way, messages purported to be from the source can be accurately authenticated in real time or near-real time. Accordingly, techniques described herein improve computer and network security by reducing the chances of successful phishing attacks. Moreover, reducing the chances of successful phishing attacks improves system and service uptime (e.g., in connection with the message system, the user device, or another system or service) as well as conserves computing resources that would otherwise be expended on remediating the successful phishing attacks.

As indicated above, FIGS. 1A-1D are provided as an example. Other examples may differ from what is described with regard to FIGS. 1A-1D.

Figure 2:
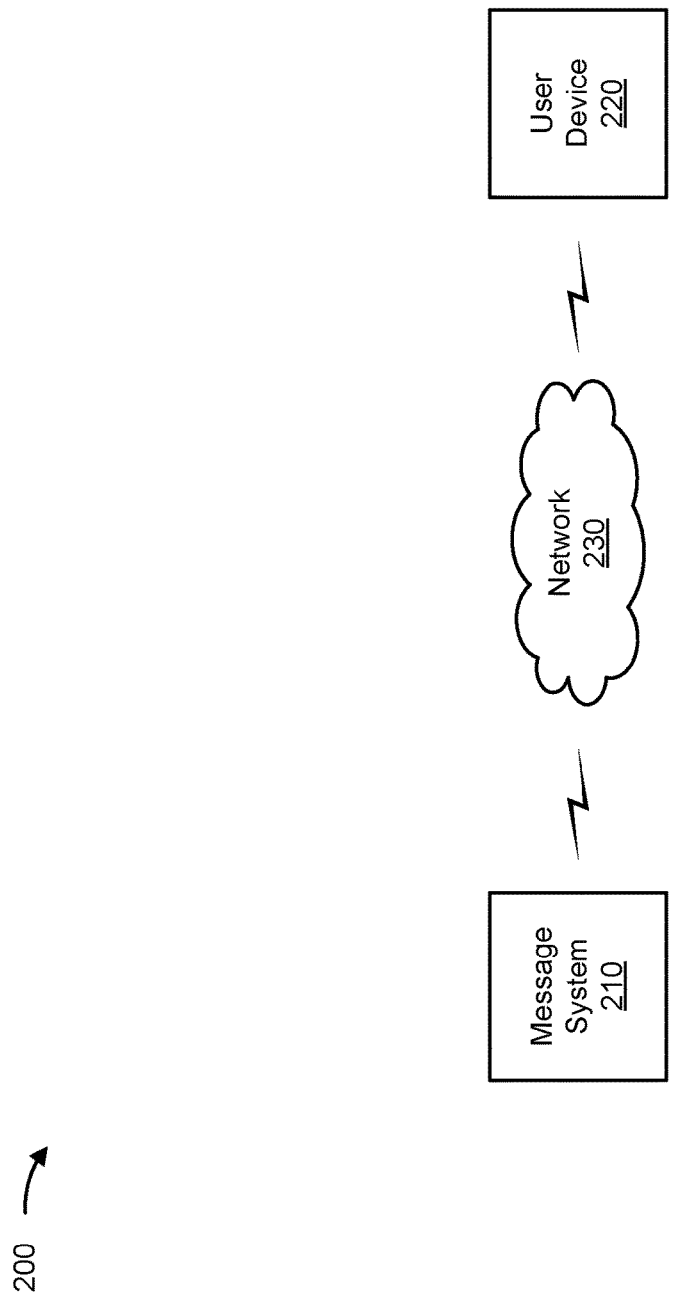
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a message system 210, a user device 220, and a network 230. Devices of environment 200 may interconnect via wired connections, wireless connections, or a combination of wired and wireless connections.

The message system 210 may include one or more devices capable of receiving, generating, storing, processing, providing, and/or routing information associated with token-based message authentication, as described elsewhere herein. For example, the message system 210 may include one or more devices, individually or collectively, capable of transmitting messages and/or authenticating messages. The message system 210 may include a communication device and/or a computing device. For example, the message system 210 may include a server, such as an application server, a client server, a web server, a database server, a host server, a proxy server, a virtual server (e.g., executing on computing hardware), or a server in a cloud computing system. In some implementations, the message system 210 may include computing hardware used in a cloud computing environment.

The user device 220 may include one or more devices capable of receiving, generating, storing, processing, and/or providing information associated with token-based message authentication, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
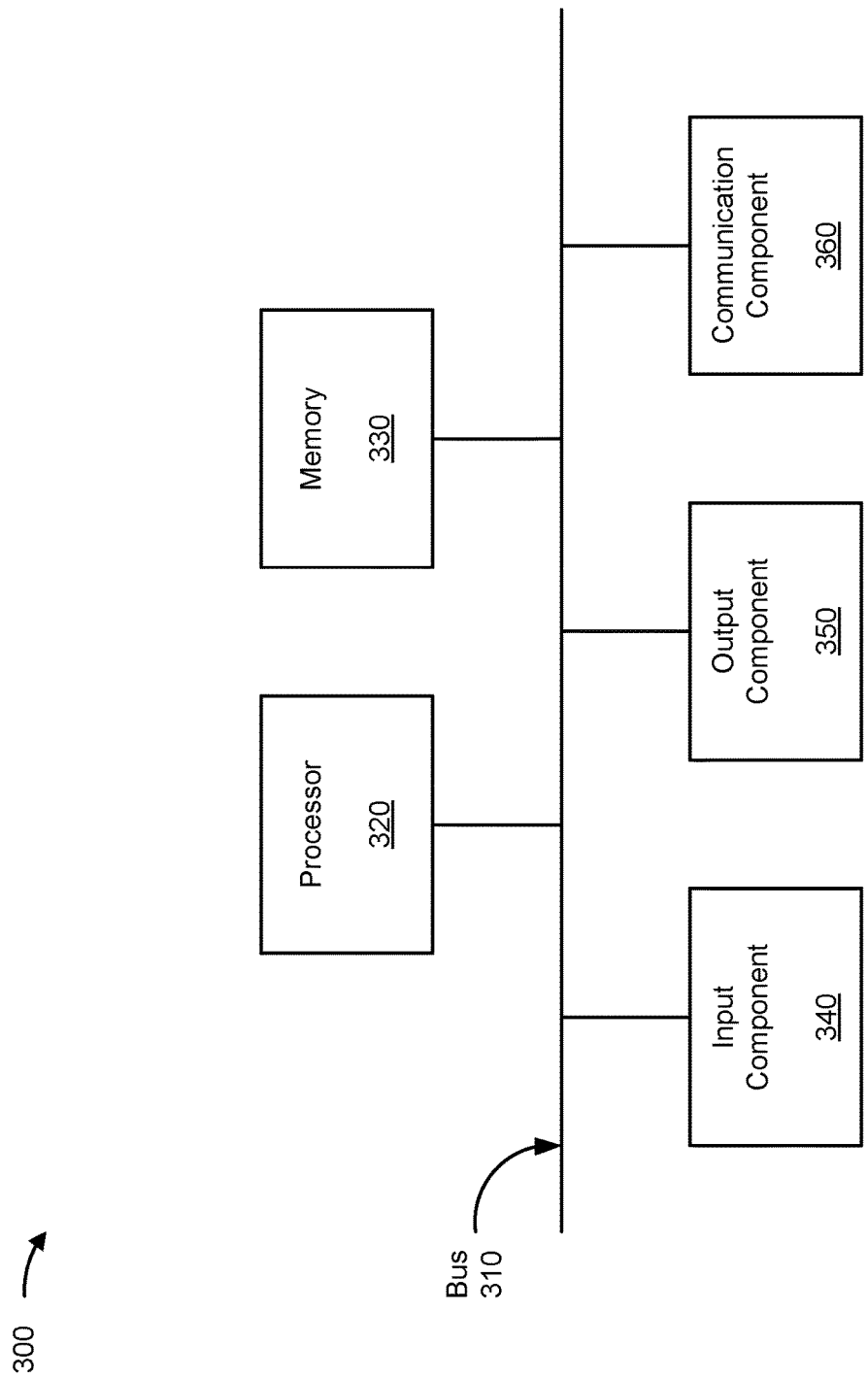
FIG. 3 is a diagram of example components of a device associated with token-based message authentication, in accordance with some embodiments of the present disclosure.

FIG. 3 is a diagram of example components of a device 300 associated with token-based message authentication. The device 300 may correspond to message system 210 and/or user device 220. In some implementations, message system 210 and/or user device 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
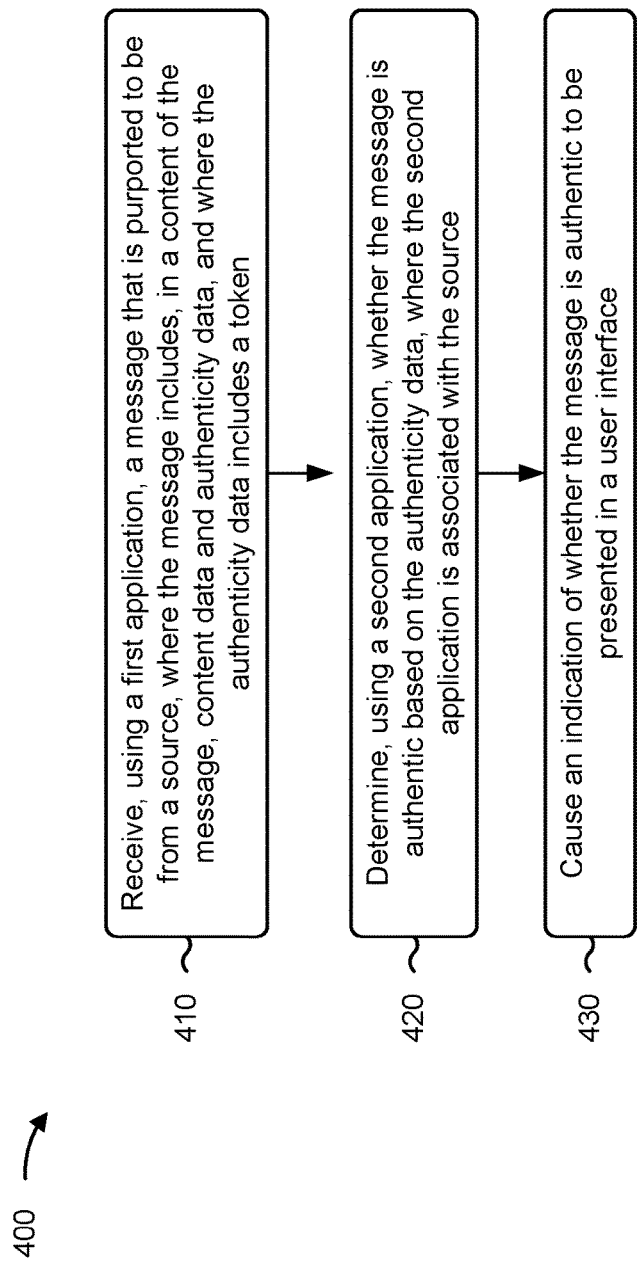
FIG. 4 is a flowchart of an example process associated with token-based message authentication, in accordance with some embodiments of the present disclosure.

FIG. 4 is a flowchart of an example process 400 associated with token-based message authentication. In some implementations, one or more process blocks of FIG. 4 may be performed by the user device 220. In some implementations, one or more process blocks of FIG. 4 may be performed by another device or a group of devices separate from or including the user device 220, such as the message system 210. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, using a first application of the user device, a message that is purported to be from a source, where the message includes, in a content of the message, content data and authenticity data, and where the authenticity data includes a token (block 410). For example, the user device 220 (e.g., using processor 320, memory 330, input component 340, and/or communication component 360) may receive, using a first application of the user device, a message that is purported to be from a source, as described above in connection with reference number 110 of FIG. 1B. As an example, the user device 220 may receive the message as an email message, a text message, an audio message in a telephone call, or the like.

As further shown in FIG. 4, process 400 may include determining, using a second application of the user device, whether the message is authentic based on the authenticity data, where the second application is associated with the source (block 420). For example, the user device 220 (e.g., using processor 320 and/or memory 330) may determine, using a second application of the user device, whether the message is authentic based on the authenticity data, as described above in connection with reference number 125 of FIG. 1B. As an example, the user device 220, using the second application, may transmit an authentication request that includes the authenticity data, and may receive an authentication response indicating whether the message is authentic.

As further shown in FIG. 4, process 400 may include causing an indication of whether the message is authentic to be presented in a user interface of the user device (block 430). For example, the user device 220 (e.g., using processor 320 and/or memory 330) may cause an indication of whether the message is authentic to be presented in a user interface of the user device, as described above in connection with reference number 145 of FIG. 1D. As an example, the user interface may be associated with the first application of the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

Figure 5:
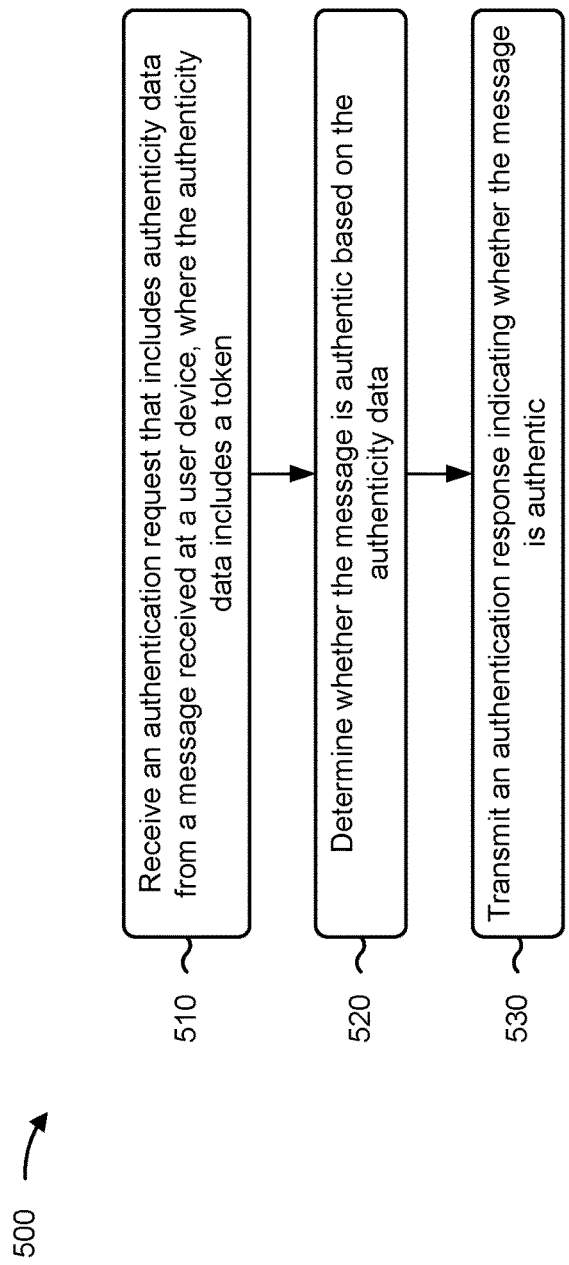
FIG. 5 is a flowchart of an example process associated with token-based message authentication, in accordance with some embodiments of the present disclosure.

FIG. 5 is a flowchart of an example process 500 associated with token-based message authentication. In some implementations, one or more process blocks of FIG. 5 may be performed by the message system 210. In some implementations, one or more process blocks of FIG. 5 may be performed by another device or a group of devices separate from or including the message system 210, such as the user device 220. Additionally, or alternatively, one or more process blocks of FIG. 5 may be performed by one or more components of the device 300, such as processor 320, memory 330, input component 340, output component 350, and/or communication component 360.

As shown in FIG. 5, process 500 may include receiving an authentication request that includes authenticity data from a message received at a user device, where the authenticity data includes a token (block 510). For example, the message system 210 (e.g., using processor 320, memory 330, input component 340, and/or communication component 360) may receive an authentication request that includes authenticity data from a message received at a user device, as described above in connection with reference number 130 of FIG. 1C. As an example, the authenticity data may include the token and/or tag data from the message.

As further shown in FIG. 5, process 500 may include determining whether the message is authentic based on the authenticity data (block 520). For example, the message system 210 (e.g., using processor 320 and/or memory 330) may determine whether the message is authentic based on the authenticity data, as described above in connection with reference number 135 of FIG. 1C. As an example, the message system 210 may compare the token of the authenticity data to a set of authentic tokens to identify whether the token matches an authentic token and/or the message system 210 may evaluate the tag data to identify whether the tag data satisfies one or more conditions of authenticity.

As further shown in FIG. 5, process 500 may include transmitting an authentication response indicating whether the message is authentic (block 530). For example, the message system 210 (e.g., using processor 320, memory 330, and/or communication component 360) may transmit an authentication response indicating whether the message is authentic, as described above in connection with reference number 140 of FIG. 1C. As an example, the authentication response may indicate that the message is authentic if the token matches an authentic token and/or if the tag data satisfies one or more conditions of authenticity.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for token-based message authentication, the system comprising:
   one or more memories; and
   one or more processors, communicatively coupled to the one or more memories, configured to:
   receive, by a first device and using a first application associated with a messaging service, a message that is purported to be from an entity,
      wherein the message includes, in a body of the message, content data and authenticity data,
         wherein the authenticity data includes a token and tag data;
   transmit, to a second device and using a second application on the first device, an authentication request that includes the authenticity data,
      wherein the second application is associated with the entity, and
      wherein the second device is associated with the entity;
   receive, from the second device and using the second application, an authentication response indicating whether the message is authentic,
      wherein the authentication response indicates that the message is authentic if the token matches an authentic token and the tag data satisfies one or more conditions of authenticity; and
   cause, based on the authentication response, an indication of whether the message is authentic to be presented in a user interface.

2. The system of claim 1, wherein the one or more processors are further configured to:
   detect, using the second application, reception of the message;

determine, using the second application and based on the content data of the message, that the message is purported to be from the entity; and extract, using the second application and based on a determination that the message is purported to be from the entity, the authenticity data from the content data of the message, wherein the authentication request includes the authenticity data extracted from the content data of the message.

3. The system of claim 1, wherein the message is an email message.

4. The system of claim 3, wherein the content data of the message is configured for presentation over a background color, and wherein the content data is configured for presentation in a contrasting color to the background color and the authenticity data is configured for presentation in the background color.

5. The system of claim 1, wherein the message is an audio message for a telephone call.

6. The system of claim 5, wherein the content data is configured to be audible for human hearing, and wherein the authenticity data is configured to be inaudible for human hearing.

7. The system of claim 1, wherein the tag data includes at least one of:

a timestamp associated with transmission of the message, location data associated with a sender of the message, or a content code indicating a type of the content data.

8. The system of claim 1, wherein the one or more processors are further configured to:

receive, using the second application, a user input identifying at least one of the message or the authenticity data.

9. The system of claim 1, wherein the user interface is associated with the first application.

10. A method of token-based message authentication, comprising:

receiving, by a user device and using a first application of the user device, a message that is purported to be from a source, wherein the first application is associated with a messaging service, and wherein the message includes, in a body of the message, content data and authenticity data, wherein the authenticity data includes a token;

transmitting, by the user device, to another device, and using a second application of the user device, an authentication request that includes the authenticity data, wherein the another device is associated with the source, and wherein the second application is associated with the source;

determining, based on the authentication request, whether the message is authentic; and causing, by the user device, an indication of whether the message is authentic to be presented in a user interface of the user device.

11. The method of claim 10, wherein the authenticity data further includes tag data that includes at least one of:

a timestamp associated with transmission of the message, location data associated with a sender of the message, or a content code indicating a type of the content data.

12. The method of claim 11, wherein the tag data includes the timestamp, and wherein determining whether the message is authentic comprises:

determining whether the timestamp corresponds to a time when messages sharing one or more characteristics with the message are supposed to be transmitted.

13. The method of claim 11, wherein the tag data includes the location data, and wherein determining whether the message is authentic comprises:

determining whether the location data corresponds to a location of an authorized sender of messages for the source.

14. The method of claim 11, wherein the tag data includes the content code, and wherein determining whether the message is authentic comprises:

processing the content data using natural language processing to identify whether the content data is of the type indicated by the content code.

15. The method of claim 10, wherein the second application is an extension or a plugin for the first application.

16. A non-transitory computer-readable medium storing a set of instructions, the set of instructions comprising:

one or more instructions that, when executed by one or more processors of a first device, cause the first device to:

receive, using a first application on the first device, a message that is purported to be from a source, wherein the first application is associated with a messaging service, and wherein the message includes, in a body of the message, content data and authenticity data, wherein the authenticity data includes a token;

transmit, using a second application on the first device and to a second device, an authentication request that includes the authenticity data, wherein the second device is associated with the source, and wherein the second application is associated with the source;

determine, based on the authentication request, whether the message is authentic; and perform one or more actions based on determining whether the message is authentic.

17. The non-transitory computer-readable medium of claim 16, wherein the one or more instructions, that cause the first device to perform one or more actions, cause the first device to:

cause an indication of whether the message is authentic to be presented in a user interface.

18. The non-transitory computer-readable medium of claim 16, wherein the one or more instructions, that cause the first device to perform one or more actions, cause the first device to:

cause, based on a determination that the message is not authentic, the message to be deleted or moved to a quarantine location.

19. The non-transitory computer-readable medium of claim 16, wherein the one or more instructions, that cause the first device to determine whether the message is authentic, cause the first device to:

transmit, using the second application, an authentication request that includes the authenticity data; and receive, using the second application, an authentication response indicating whether the message is authentic, wherein the authentication response indicates that the message is authentic if the token matches an authentic token.

20. The non-transitory computer-readable medium of claim 16, wherein the token is a hash value of the content data.

\* \* \* \* \*